(12) United States Patent  
Baumann

(10) Patent No.: US 6,745,654 B2  
(45) Date of Patent: Jun. 8, 2004

(54) LATHE

(75) Inventor: Ulrich Baumann, Lenningen (DE)

(73) Assignee: Traub Drehmaschinen GmbH, Reichenbach (DE)

( * ) Notice: Subject to any disclaimer, the term of this patent is extended or adjusted under 35 U.S.C. 154(b) by 113 days.

(21) Appl. No.: 10/176,104

(22) Filed: Jun. 19, 2002

(65) Prior Publication Data

US 2003/0019336 A1 Jan. 30, 2003

(30) Foreign Application Priority Data

Jun. 22, 2001 (DE) .......................... 101 30 760

(51) Int. Cl.[7] .............................. B23B 9/00; B23B 29/24
(52) U.S. Cl. .......................................... 82/120; 82/129
(58) Field of Search .................... 82/120, 118, 129, 82/121, 137, 138, 142, 150, 151; 29/35.5, 36, 40

(56) References Cited

U.S. PATENT DOCUMENTS

| | | | | |
|---|---|---|---|---|
| 4,612,832 A | * | 9/1986 | Ushigoe et al. ................ | 82/129 |
| 4,683,787 A | * | 8/1987 | Link .............................. | 82/18 |
| 5,302,501 A | * | 4/1994 | Tamura et al. ............... | 430/537 |
| 5,787,560 A | * | 8/1998 | Schalles ......................... | 29/36 |
| 6,298,758 B1 | * | 10/2001 | Wu .............................. | 82/117 |
| 6,357,324 B1 | * | 3/2002 | Zackrisson et al. ........... | 32/1.11 |

FOREIGN PATENT DOCUMENTS

| | | |
|---|---|---|
| DE | 196 21 406 | 12/1997 |
| DE | 198 51 228 | 5/2000 |
| EP | 0 857 096 | 8/1998 |
| EP | 0 999 002 | 5/2000 |
| WO | 02/24385 | 3/2002 |
| WO | 02/24386 | 3/2002 |

* cited by examiner

*Primary Examiner*—Willmon Fridie, Jr.
(74) *Attorney, Agent, or Firm*—Barry R. Lipsitz; Douglas M. McAllister

(57) ABSTRACT

In order to design a lathe comprising
  a machine frame,
  a first working spindle for a first workpiece held on the machine frame,
  at least one first tool carrier for the machining of the first workpiece,
  a second working spindle for a second workpiece which can be brought from a coaxial position into a non-coaxial position in a transverse direction in relation to the first working spindle,
  and a first tool carrier on the front side associated with a first working space,
  and a second tool carrier on the front side associated with a second working space, in such a manner that it is possible for machining operations on the first workpiece and the second workpiece to be as flexible as possible, it is suggested that the first tool carrier on the front side and the second working spindle be movable in the transverse direction relative to one another controlled by a machine control.

29 Claims, 17 Drawing Sheets

LATHE

This application claims the benefit of German Patent Application No. 101 30 760.8 filed on Jun. 22, 2001.

BACKGROUND OF THE INVENTION

The invention relates to a lathe, comprising a machine frame, a first working spindle held on the machine frame and rotatable about a first spindle axis, this working spindle having a first receiving means for a first workpiece, at least one first tool carrier which can be moved in an X direction transversely to the first spindle axis for the machining of the first workpiece, a second working spindle which is rotatable about a second spindle axis, has a second workpiece receiving means for a second workpiece and in relation to the first working spindle can be brought from a position coaxial with the second spindle axis in relation to the first spindle axis into a non-coaxial position in a transverse direction extending transversely to the X direction and transversely to the first spindle axis, the first and the second spindle axes being arranged at a distance from one another in this non-coaxial position, and a first tool carrier on the front side for the machining of the first workpiece, this tool carrier being associated with a first working space and being movable from an inactive into an active position and vice versa with at least one tool as a result of a movement transversely to the X direction, as well as a second tool carrier on the front side for the machining of the second workpiece, this tool carrier being associated with a second working space and being arranged so as to be offset in the transverse direction in relation to the first working space.

Lathes of this type are known from the state of the art, for example, German patent application 196 21 406, wherein, in this known solution, the first tool carrier on the front side and the second working spindle can be moved together in the transverse direction.

As a result, it is necessary to coordinate the machining of the first workpiece with the tools arranged in the first tool carrier on the front side and the machining of the second workpiece with the tools arranged on the second tool carrier on the front side exactly with one another.

SUMMARY OF THE INVENTION

The object underlying the invention is, therefore, to design a lathe of the type described at the outset in such a manner that it is possible for machining operations on the first workpiece and the second workpiece to be as flexible as possible.

This object is accomplished in accordance with the invention, in a lathe of the type described at the outset, in that the first tool carrier on the front side and the second working spindle can be moved relative to one another in the transverse direction controlled by the machine control so that the movements of the second working spindle and the first tool carrier on the front side can be realized independently of one another.

As a result, it is possible to machine the first workpiece and the second workpiece at the same time, wherein the machining operations can be carried out disconnected from one another.

A tool carrier on the front side is to be understood within the scope of this application as a tool carrier which is arranged on a front side of a working space, in particular, opposite the working spindle. This tool carrier on the front side may bear tools, with which a front side of the workpiece can be machined but also tools for the circumferential machining at least close to the front side of the workpiece.

The relative movability of the second working spindle and the first tool carrier on the front side may be realized in the most varied of ways. It would, for example, be conceivable to move both in transverse direction on a common slide and to provide on this common cross slide an additional cross slide for the movement either of the second working spindle or of the first tool carrier on the front side in the transverse direction.

For reasons of the rigidity of the construction and the simplicity of the control, it is, however, particularly favorable when the first tool carrier on the front side and the second working spindle are each seated on a cross slide which can be moved in the transverse direction.

In principle, the first tool carrier on the front side could be displaceable with the cross slide directly in relation to the machine frame and independently thereof the second working spindle could also be arranged so as to be displaceable with the cross slide on the machine frame.

A solution which is particularly favorable from a constructional point of view on account of the space required provides for the first tool carrier on the front side to be seated on the same console as the second working spindle with its cross slide so that the mounting of the two relative to the machine frame is brought about via the console.

It is, therefore, possible, for example, to provide common guide means for the cross slide of the first tool carrier on the front side and the cross slide of the second working spindle, both being guided in the transverse direction on these guide means.

In order to have an additional axis of movement available during the machining of the first workpiece with the first tool carrier on the front side, it has proven to be favorable when the first tool carrier on the front side and the second working spindle are seated on a common slide movable in X direction in relation to the machine frame. Such a slide can be formed, for example, by the console.

This slide offers the possibility, on the one hand, of moving the tools of the first tool carrier on the front side not only in transverse direction but also in the X direction; on the other hand, this solution offers a simple possibility of positioning the second working spindle coaxially to the first working spindle for the transfer of the first machined workpiece to the second working spindle.

With respect to the movability of the second tool carrier on the front side relative to the second spindle axis, no further details have so far been given.

In principle, it is sufficient to utilize the movability of the second working spindle in the transverse direction for positioning the second workpiece relative to the tool of the second tool carrier on the front side.

If, for example, the second tool carrier on the front side is provided with a row of tools extending in the transverse direction, different tools can also be approached as a result of displacement in the transverse direction and machining operations can also be carried out at different radial distances from the second spindle axis due to the relative position of the second spindle axis in relation to the respective tool in the transverse direction.

However, in order not to allow the constructional size of the lathe to increase in the transverse direction and, therefore, also to keep the rigidity of the construction as great as possible during the machining of the second workpiece, it is preferably provided for the second tool carrier on the front side to be movable transversely to the second spindle axis and in a direction extending transversely to the transverse direction.

As a result, it is possible, on the one hand, to position the second workpiece relative to the respective tools of the second tool carrier on the front side due to the displacement of the second working spindle in the transverse direction but, at the same time, it is also possible to change from one tool of the second tool carrier on the front side to the other tool due to movement of the second tool carrier transversely to the transverse direction and, at the same time, to have two axes, namely and conventionally speaking, an X and a Y axis available for the machining of the second workpiece with each individual tool of the second tool carrier on the front side.

In this respect, the second tool carrier on the front side is preferably movable approximately in X direction.

In order, on the one hand, to achieve as rigid a construction as possible and in order, on the other hand, to keep the resources for the control of the machining of the second workpiece as small as possible, it is preferably provided for the second tool carrier on the front side to be guided on the console bearing the cross slide for the second working spindle so as to be movable so that the movement of the second tool carrier takes place relative to the part bearing the cross slide of the second working spindle and, therefore, no additional positioning inaccuracies influence the precision during the machining of the second workpiece.

With respect to the movability of the second working spindle, no further details have so far been given.

It would, for example, be conceivable to realize the transfer of the first workpiece to the second working spindle as a result of the Z displaceability of the first workpiece on account of the displaceability of the first working spindle and to realize the machining of the second workpiece as a result of a corresponding Z displaceability of the second tool carrier on the front side.

However, it has proven to be particularly favorable when the second working spindle can be displaced in the direction of the second spindle axis.

For this purpose, the second working spindle is preferably arranged on a Z slide which is seated, for its part, on the cross slide.

As a result, it is possible, on the one hand, to realize the transfer of the first workpiece to the working spindle by way of displacement of the same and, on the other hand, it is possible to realize the Z axis movement for the machining of the second workpiece with the tools of the second tool carrier on the front side by way of displacement of the working spindle.

In order to be able, in addition, to carry out more complex machining operations, it has proven to be favorable when the second working spindle can be pivoted about a pivot axis extending transversely to the second spindle axis.

This pivot axis could, in principle, extend in different directions transversely to the second spindle axis. However, a solution which is particularly favorable from a constructional point of view provides for the pivot axis to extend transversely to the X direction.

It is particularly favorable when the pivot axis extends approximately parallel to the transverse direction so that the second working spindle is not offset in a transverse direction due to pivoting thereof.

With respect to the design of the first tool carrier on the front side, no further details have so far been given. For example, it would be conceivable to bring the tools of the first tool carrier on the front side into use in that the first workpiece is moved in the direction of the tools of the first tool carrier on the front side due to the displaceability of the first working spindle in Z-direction in order to realize the required Z axis movement.

It has proven to be particularly favorable when the first tool carrier on the front side is movable in a direction parallel to the first spindle axis.

As a result, it is merely necessary to use the movability of the first workpiece in Z direction by means of the first working spindle for the relative positioning of the tools of the first tool carrier relative to the first workpiece in Z direction and independently thereof to use the tools of the first tool carrier on the front side for the machining on the first workpiece, wherein during the Z axis positioning of the first tool carrier on the front side the Z axis positions of the first workpiece, brought about by the displacement of the first working spindle, have to be taken into account for calculations. As a result, it is, however, possible to operate with the tools of the first tool carrier on the front side independently of the tools of the first tool carrier.

In this respect, it is particularly favorable when the first tool carrier on the front side and the second working spindle can be moved in the direction of the spindle axes independently of one another so that during any machining of the first and the second workpieces the tools of the first tool carrier on the front side and the tools of the second tool carrier on the front side can be used independently of one another.

From a constructional point of view, the movability of the first tool carrier on the front side in Z direction may be realized particularly favorably in that this is seated on a Z slide which can be moved in Z direction and, for its part, is seated on the cross slide for the first tool carrier on the front side.

With respect to the arrangement of the tools on the first tool carrier on the front side, no further details have so far been given.

For example, it would be conceivable to provide a single tool on the first tool carrier on the front side.

For reasons of as optimum a use of tools as possible for complex machining operations, it is particularly favorable when the first tool carrier on the front side has a row of tools arranged so as to follow one another in a longitudinal direction.

The longitudinal direction of such a row can extend in different directions. One particularly advantageous embodiment provides for the longitudinal direction to extend approximately parallel to the transverse direction so that different tools of the first tool carrier on the front side can be brought into use at the same time due to movement of this tool carrier in the transverse direction.

In addition, the number of tools may be multiplied in that the first tool carrier on the front side has at least two tools which are arranged around a pivot axis in angular spaced relationship to one another and can be brought into an active or inactive position due to pivoting of the tool carrier about the pivot axis.

As a result, it is particularly advantageous to also multiply, for example, the number of rows of tools which can be brought into use, namely in that the pivot axis extends parallel to the respective rows so that different respective rows are in an active position due to pivoting about the pivot axis.

With respect to the alignment of the pivot axis relative to the remaining axes of the lathe, it has proven to be particularly favorable when the pivot axis extends approximately parallel to the transverse direction.

In order to be able to use the pivot axis, in addition, for complex machining operations it is preferably provided for the pivot axis to be designed as a B axis which can be controlled by the machine control so that the pivot axis can be used not only to bring the plurality of tools into active or inactive positions but also to bring the tools into positions which are inclined in relation to the first spindle axis, for example, extend at an acute angle.

With respect to the arrangement of the tools on the second tool carrier on the front side, further details have likewise not been given so far. For example, in the simplest case the arrangement of a single tool on the second tool carrier on the front side would be possible. In order to be able to carry out more complex machining operations, it has proven to be advantageous when the second tool carrier on the front side has a row of tools arranged so as to follow one another in a longitudinal direction.

The longitudinal direction can likewise preferably extend in different directions. It has, however, proven to be particularly favorable when the longitudinal direction extends approximately parallel to the direction of movement of the second tool carrier on the front side. Alternatively or in addition to the arrangement of the tools in rows it is preferably provided for the second tool carrier on the front side to have at least two tools which are arranged in angular spaced relationship about a pivot axis and can be moved from an active into an inactive position and vice versa due to pivoting of the second tool carrier about the pivot axis.

Particularly in the case of the embodiments, with which the tool carriers are arranged in a row, it is preferably provided for the pivot axis to extend parallel to the rows so that different rows of tools of the second tool carrier on the front side can be brought into use due to pivoting about the pivot axis.

In this respect, it is particularly expedient when the pivot axis extends approximately parallel to the direction of movement of the second tool carrier on the front side so that no shifting in the direction of the direction of movement takes place due to pivoting of the tools about the pivot axis.

In order to also be able to carry out more complex machining operations in addition to the use of different tools, it is preferably provided for the pivot axis for the second tool carrier on the front side to be designed as a B axis which can be controlled by the machine control so that a complete B axis functionality can be realized during the pivoting of the tools of the second tool carrier on the front side and, therefore, these tools can be aligned, for example, at defined acute angles relative to the second spindle axis.

With respect to the arrangement of the tools relative to the pivot axes in the case of the tool carriers on the front side, no further details have been given in conjunction with the preceding explanations concerning the individual embodiments of the present invention. In principle, it is conceivable to arrange the tools such that the direction of force occurring during the machining runs to the side of the pivot axes, as is the case for the tool carriers with a B axis normally provided in lathes.

However, it is particularly favorable when the tools are arranged relative to the pivot axis such that the force acting on the tools during the machining is directed essentially in a radial direction in relation to the pivot axis so that the force occurring during the machining generates a negligible or at least slight torque in the direction of the pivot axis and, therefore, the pivot drive for the tool carriers on the front side need not withstand any large moments, whereby an adequately high rigidity can be achieved with a simple, mechanical construction.

The inventive lathe can be designed in the most varied of ways for the machining of the first workpiece.

For example, it would be conceivable to design the lathe as a so-called short turning lathe and to guide the first workpiece exclusively by means of the first working spindle.

In this respect, it is preferably provided for the first working spindle to be guided on the machine frame for displacement in the direction of the first spindle axis, i.e., it can be moved in Z direction so that a complete machining of the workpiece is possible due to displaceability of the first tool carrier in X direction.

It is, however, also conceivable to configure the first tool carrier so as to be displaceable, in addition, in Y direction transversely to the first spindle axis.

In another preferred embodiment of the inventive solution it is preferably provided for the guidance of the first workpiece during the machining to be brought about by a longitudinal turning guide bush. As a result, the machining of the first workpiece takes place in the manner of a longitudinal turning, wherein the guidance transversely to the spindle axis is brought about by the longitudinal turning guide bush as close to the active tools as possible.

The longitudinal turning may be realized in the most varied of ways, wherein a relative movement between the longitudinal turning guide bush and the working spindle is always required.

A particularly favorable solution provides for the longitudinal turning guide bush to be held on the machine frame so as to be non-displaceable in the direction of the first spindle axis while the displaceability in Z direction is expediently brought about by displacement of the first working spindle relative to the longitudinal turning guide bush.

Additional features of the invention are the subject matter of the following description as well as the drawings illustrating several embodiments.

BRIEF DESCRITPION OF THE DRAWINGS

In the Drawings

Figure 16:
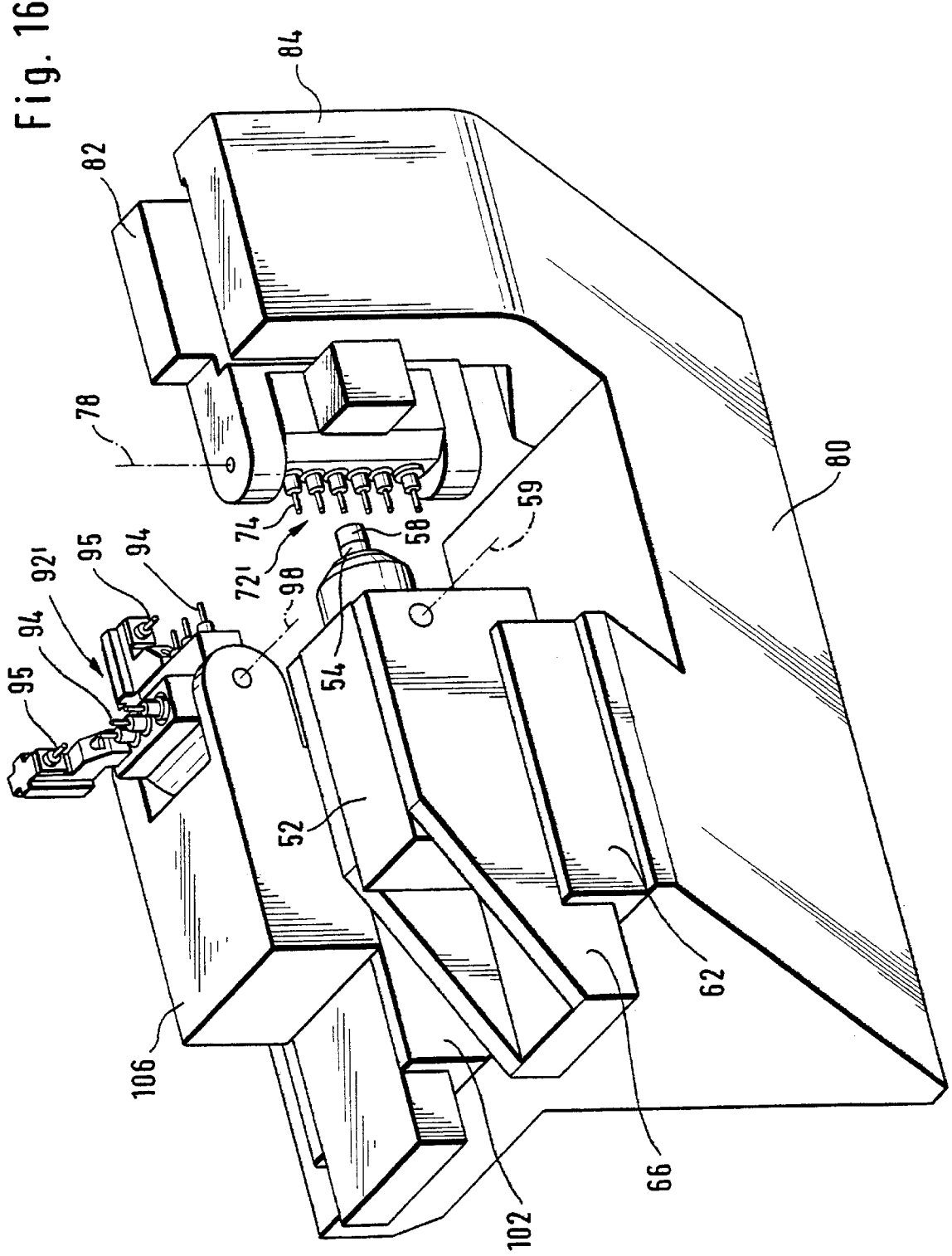
FIG. 16 shows a sectional illustration of the console of the second embodiment of the inventive lathe with the second tool carrier on the front side and the second working spindle but a second spindle axis extending at right angles to the pivot axis 78.
Figure 17:
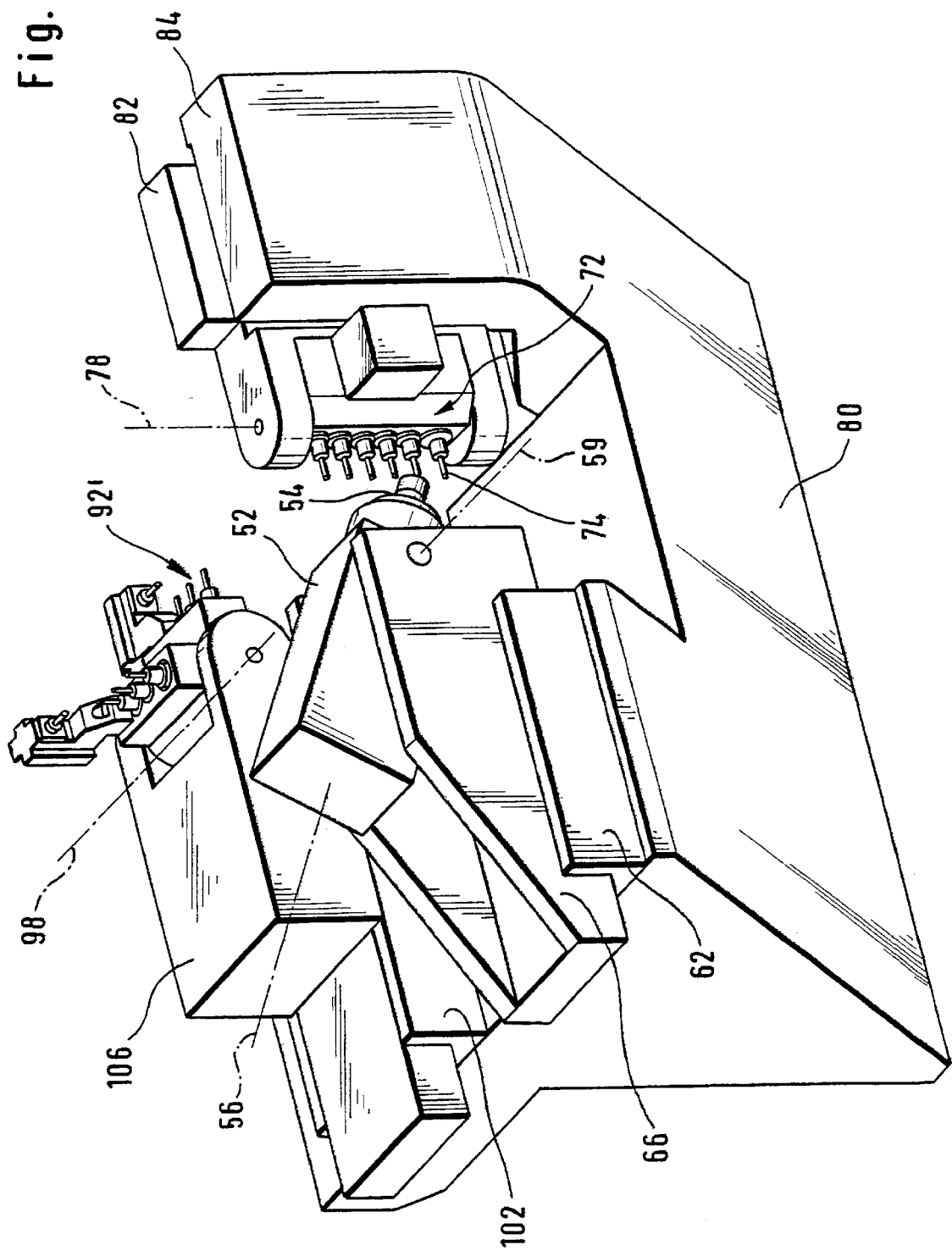

FIG. 17 shows an illustration similar to FIG. 16 with a second spindle axis 56 extending at an angle of less than 90° in relation to the pivot axis 78.

DETAILED DESCRIPTION OF THE INVENTION

Figure 1:
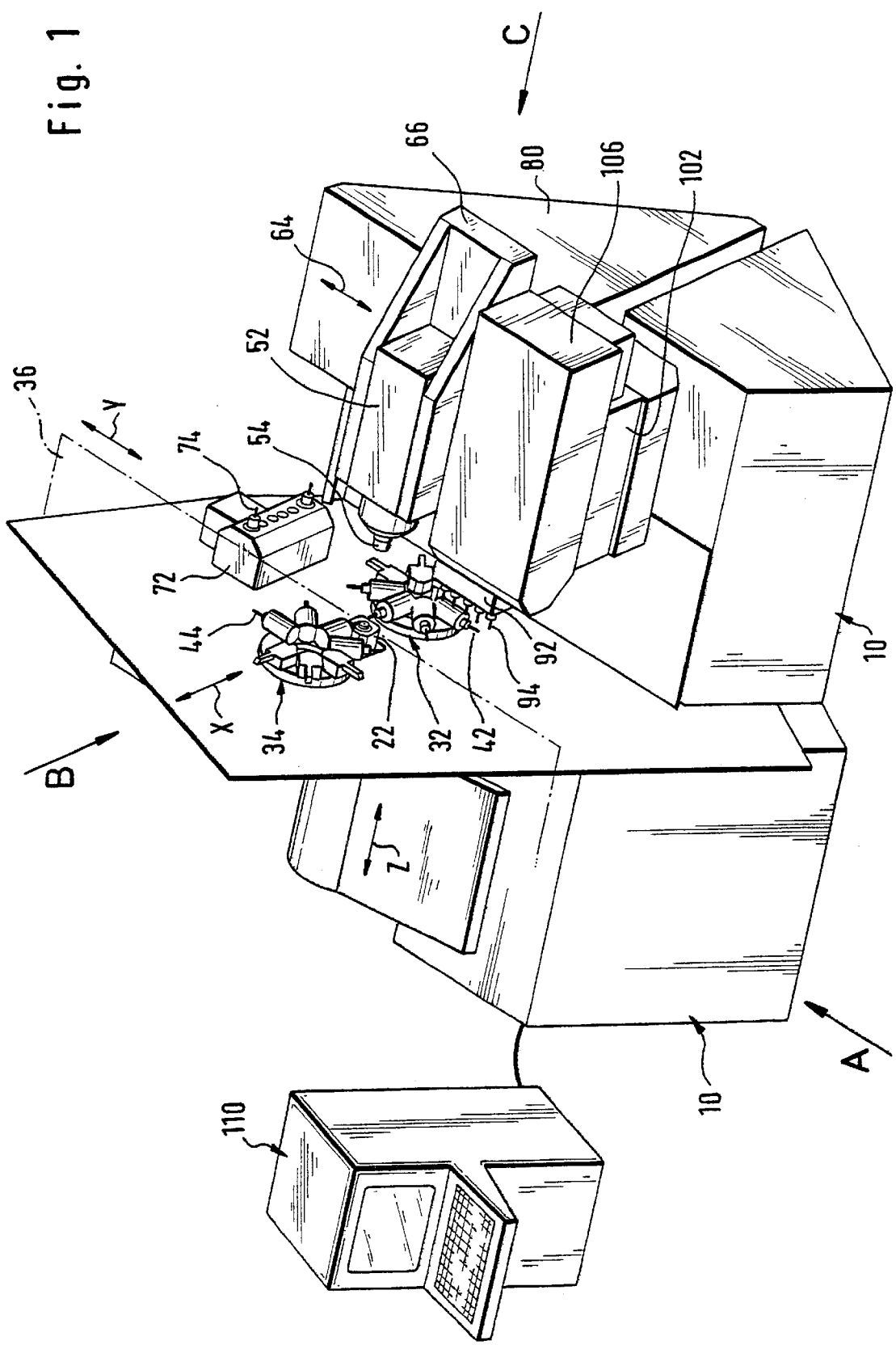
FIG. 1 shows a perspective view of a first embodiment of an inventive lathe.

A first embodiment of an inventive lathe, illustrated in FIG. 1, comprises a machine frame designated as a whole as 10, on which a first spindle housing 12 is mounted, in which a first working spindle 14 is mounted for rotation about a first spindle axis 16.

The first working spindle 14 is provided with a first receiving means 18 for a first workpiece 20 which is formed in the illustrated case by an end piece of a bar of material 21.

The bar of material 21 extends through the first working spindle 14 and, in addition, from the first receiving means 18 as far as a longitudinal turning guide bush 22 which is held stationarily on the machine frame 10.

In order to be able to insert the bar of material 21 into the longitudinal turning guide bush 22 and push it therethrough, the first spindle housing 12 is held on a slide 24 which can be displaced in relation to the machine frame 10 in a Z direction extending parallel to the first spindle axis 16.

Figure 2:
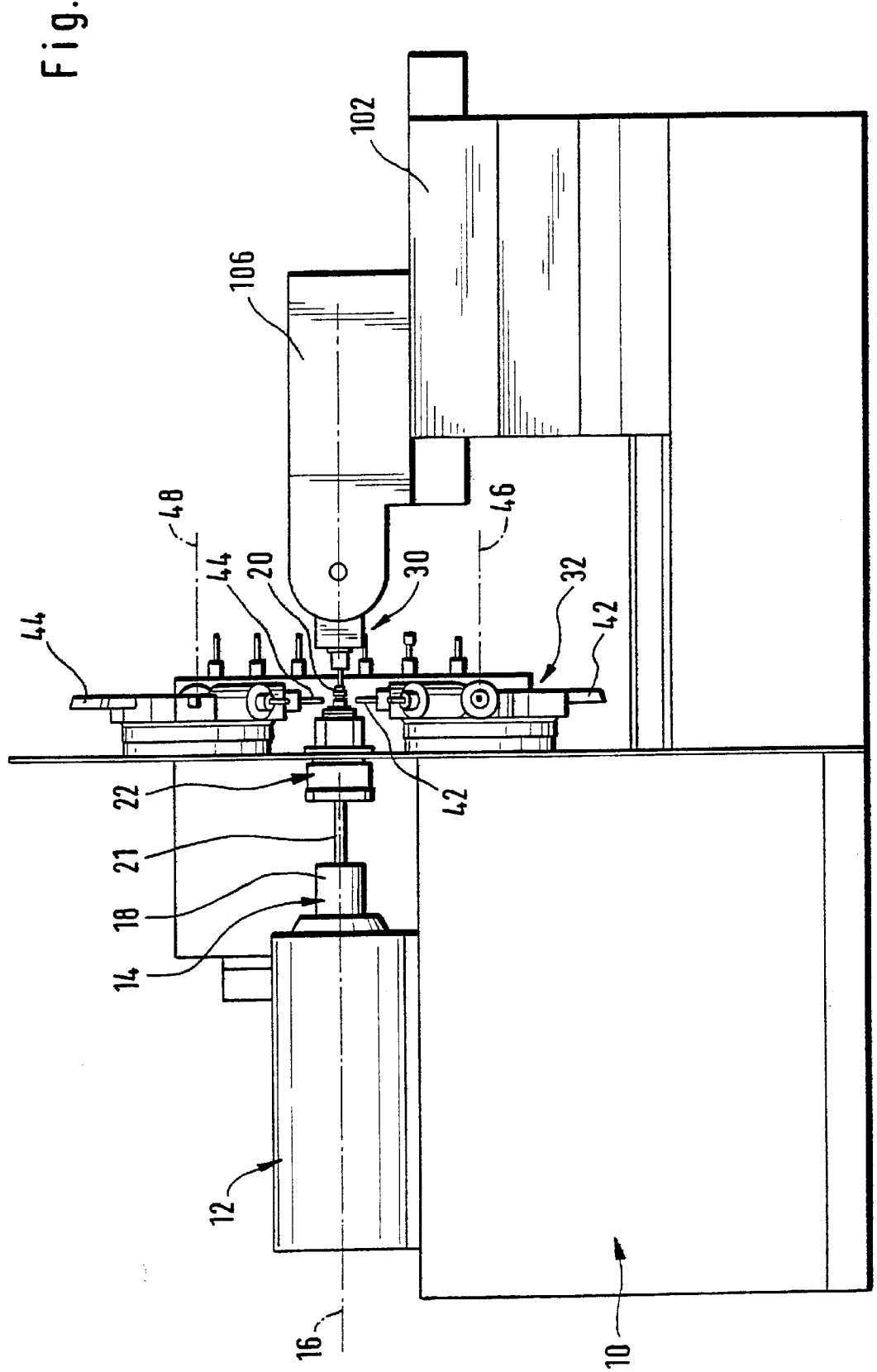
FIG. 2 shows a front view in the direction of arrow A in FIG. 1.
Figure 3:
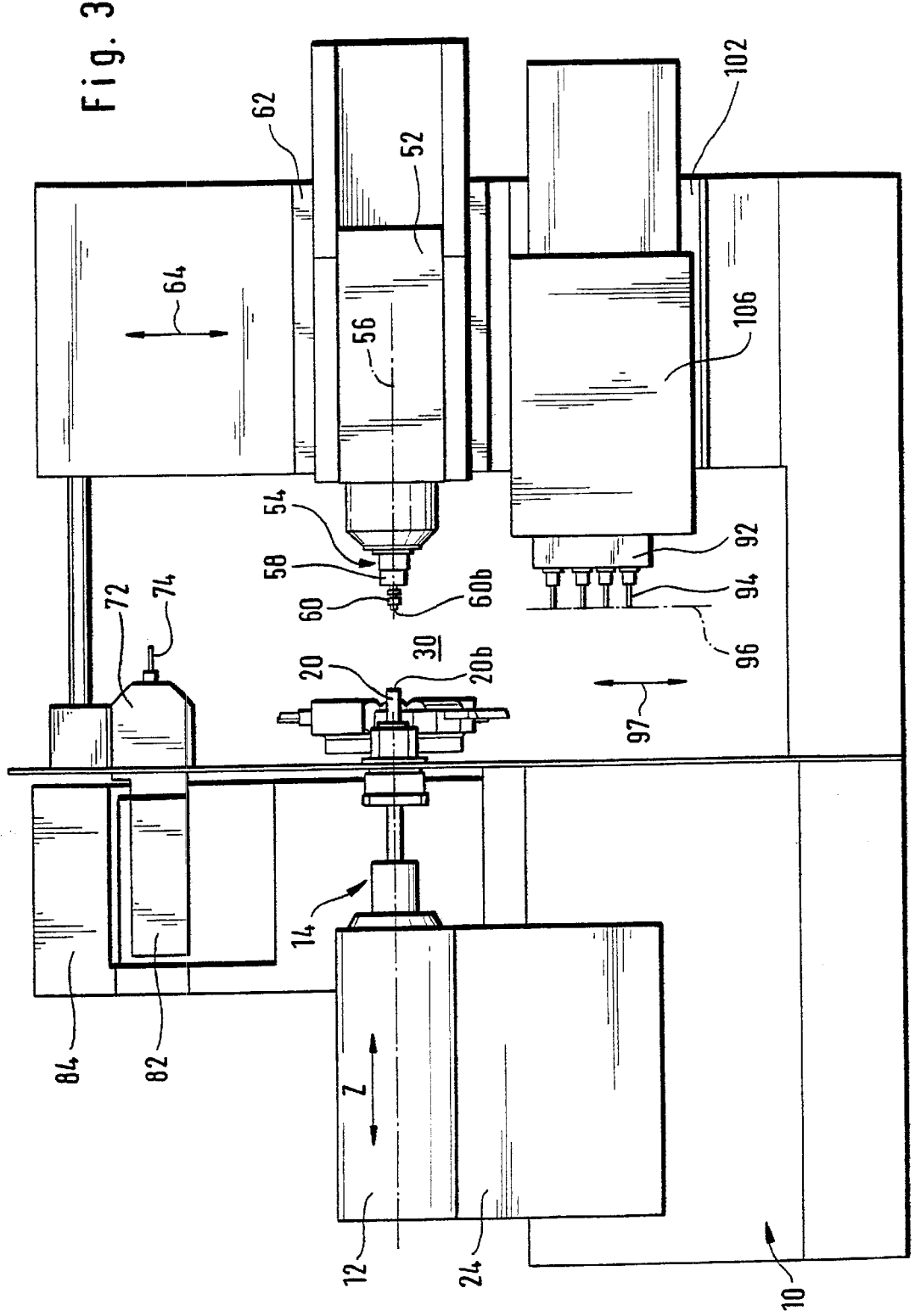
FIG. 3 shows a plan view in the direction of arrow B in FIG. 1 in an operating state, in which the machined first workpiece has just been taken over by the second working spindle.
Figure 4:
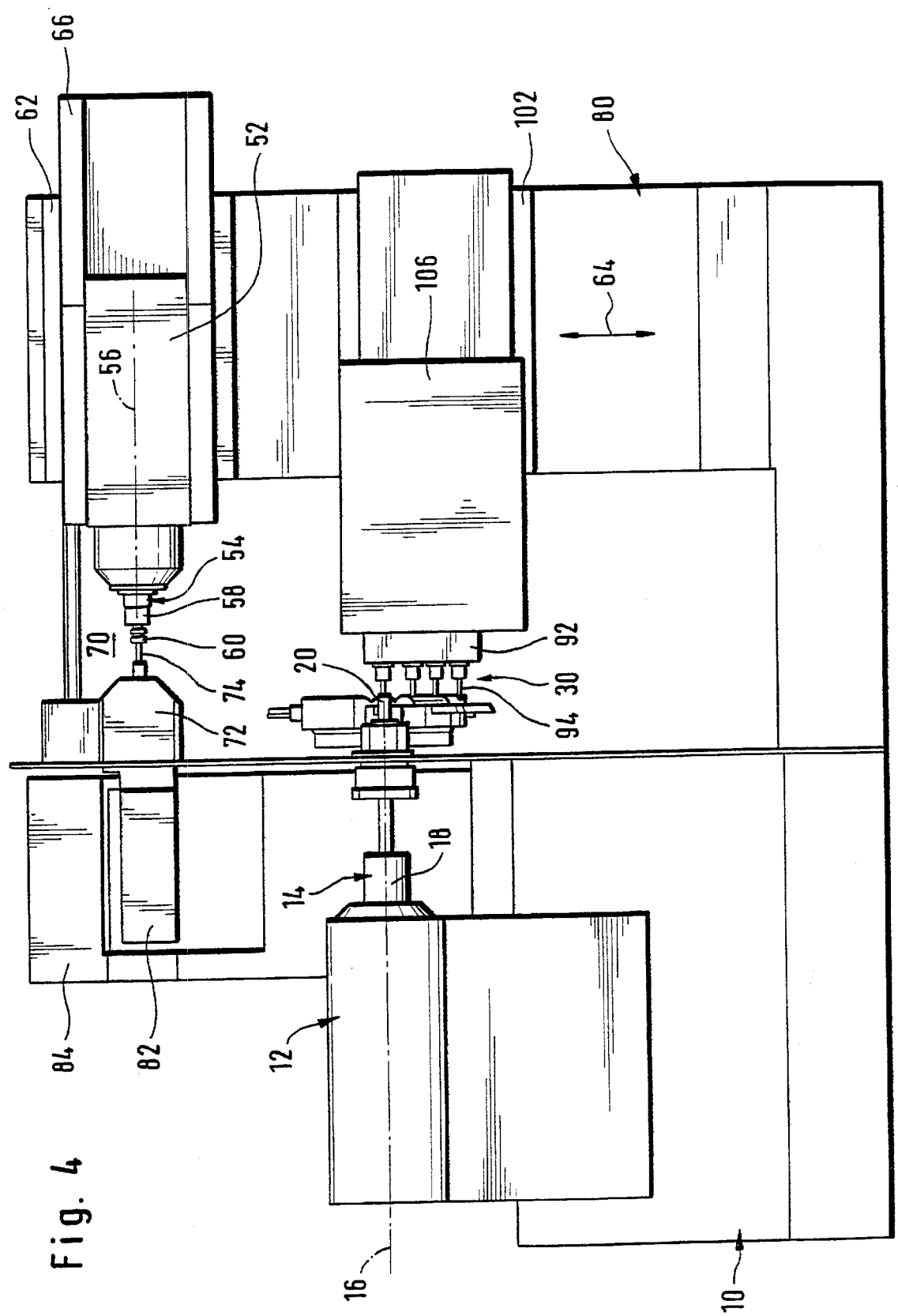
FIG. 4 shows an illustration similar to FIG. 3, in which a machining of the first workpiece and of the second workpiece takes place at the same time.
Figure 5:
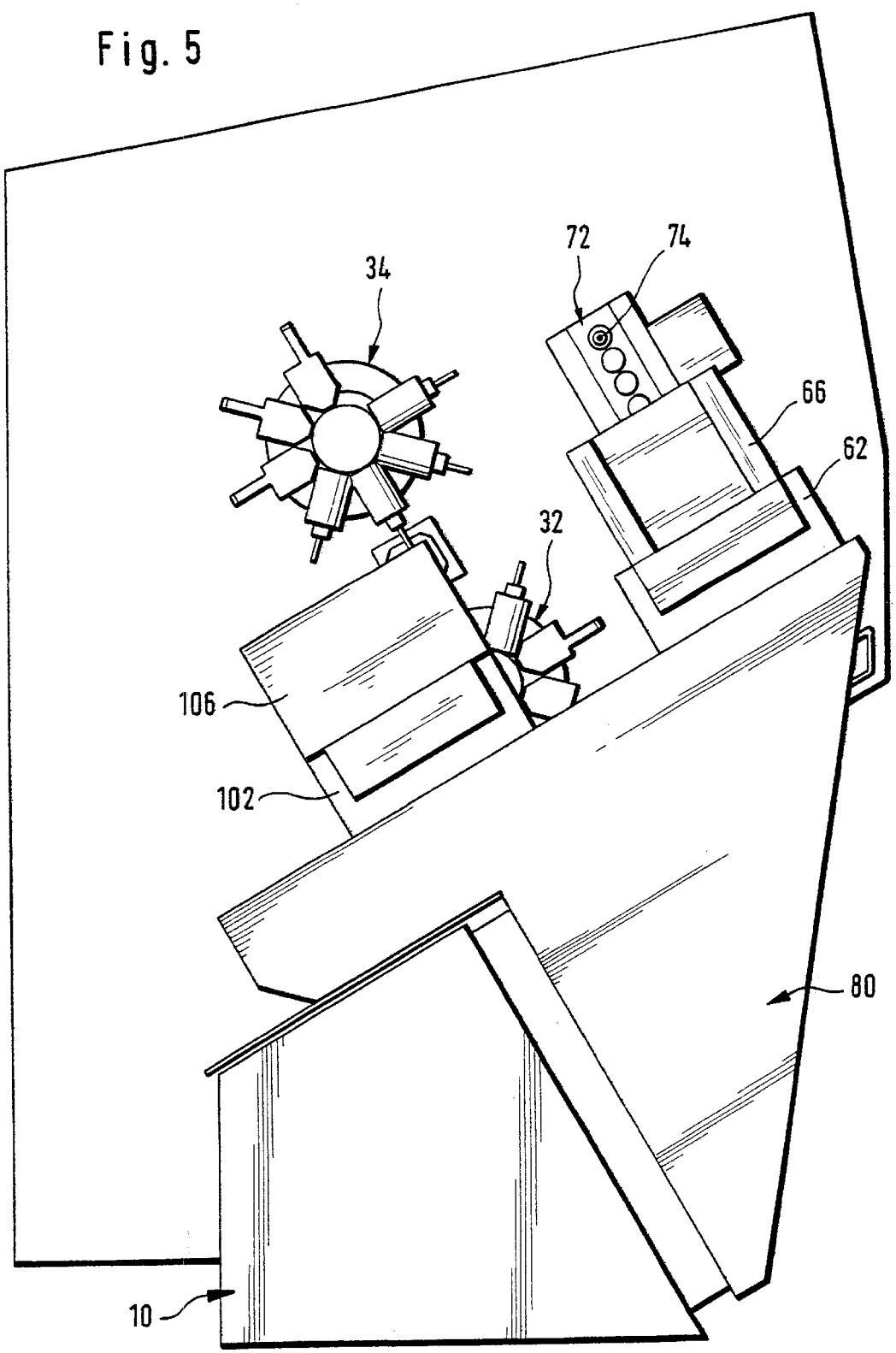
FIG. 5 shows a view in the direction of arrow C in FIG. 1 with a console displaced to a maximum in the direction of the machine base.

On a side of the longitudinal turning guide bush 22 located opposite the first working spindle 14, the workpiece 20 projects into a first working space 30, in which, as illustrated in FIGS. 1 to 3, a machining of the workpiece 20 is possible with two tool carriers 32 and 34 which are arranged on opposite sides of a plane 36 extending through the first spindle axis 16 and can be moved in the direction of the workpiece 20 parallel to an X direction extending at right angles to the plane 36. Depending on the embodiment, it is also possible to design one or both tool carriers 32, 34 so as to be movable, in addition, in Y direction, i.e., parallel to the plane 36.

The tool carriers 32 and 34 are preferably designed as tool turrets which can be equipped with a plurality of tools 42 and 44, wherein the tool turrets 32, 34 are rotatable about turret axes 46 and 48, respectively, which preferably extend parallel to the first spindle axis 16, whereby the individual tools 42 and 44, respectively, can be brought into their working position respectively facing the workpiece 20.

The machining of the workpiece 20 projecting out of the longitudinal turning guide bush 22 into the first working space 30 is brought about, on the one hand, by advancing the tools 42 and 44, respectively, in X direction and, on the other hand, by displacing the workpiece 20 in Z direction as a result of displacement of the working spindle 14 in Z direction by means of the Z slide 24, wherein the working spindle 14 holds the workpiece 20 securely clamped with the receiving means 18 and drives it for rotation about the first spindle axis 16 while the longitudinal turning guide bush 22 guides the first workpiece 20 precisely in a radial direction in relation to the first spindle axis 16 only close to the first working space 30 and absorbs the machining forces.

In order to be able to machine the first workpiece 20 not only by means of the tool carriers 32 and 34 with the tools 42 and 44, respectively, but also to be able to carry out a complete machining of the workpiece 20, a second working spindle 54 is provided on the machine frame 10 in addition to the working spindle 14, this second working spindle being mounted for rotation in a second spindle housing 52 and being rotatable about a second spindle axis 56 aligned preferably parallel to the first spindle axis 16. The second working spindle 52 is arranged such that it can be positioned on a side of the first working space 30 located opposite the longitudinal turning guide bush 22.

The second working spindle 54 is likewise provided with a second receiving means 58 for clamping a workpiece 60, wherein the second workpiece 60 can be generated by cutting the first workpiece 20 off the bar of material 21.

The second spindle housing 52 is seated on a cross slide which is designated as a whole as 62 and can be moved relative to the machine frame 10 in a transverse direction 64, which could also be designated as Y direction, transversely to the second spindle axis 56 and transversely to the X direction, wherein the movability of the cross slide 62 in the transverse direction 64 comprises the possibility of aligning the second working spindle 54 with the second spindle axis 56 coaxially to the first spindle axis 16 and therefore of taking over the workpiece 20 from the first receiving means 18.

For this purpose, the second spindle housing 52 is, in addition, arranged on a Z slide 66 which is seated on the cross slide 62 and allows a movability of the second spindle housing 52 relative to the cross slide 62 in a direction parallel to the first spindle axis 16 and to the second spindle axis 56.

As a result, it is possible to cut off the workpiece 20 with the aid of one of the tools 42 or 44 due to interaction of the first working spindle 14 and the second working spindle 54 with a coaxial alignment of the spindle axes 16 and 56 in a transfer position and then to finish machining it as a second workpiece 60, wherein, for this purpose, the second working spindle 54 is displaced by means of the cross slide 62 in the transverse direction 64 out of the first working space 30 to such an extent until the second workpiece 60 is facing, in a second working space 70, a second tool carrier 72 on the front side, the tools 74 of which point in the direction of the workpiece 60 in their operative position.

As a result of the displaceability of the second working spindle 54 from its transfer position into the operative position, it is possible to move the second workpiece 16 which has been cut from the bar out of the first working space 30 into the second working space 70 by means of the second working spindle 54, wherein the second working space 70 is arranged next to the first working space 30, for example, offset laterally in the transverse direction 64.

Figure 7:
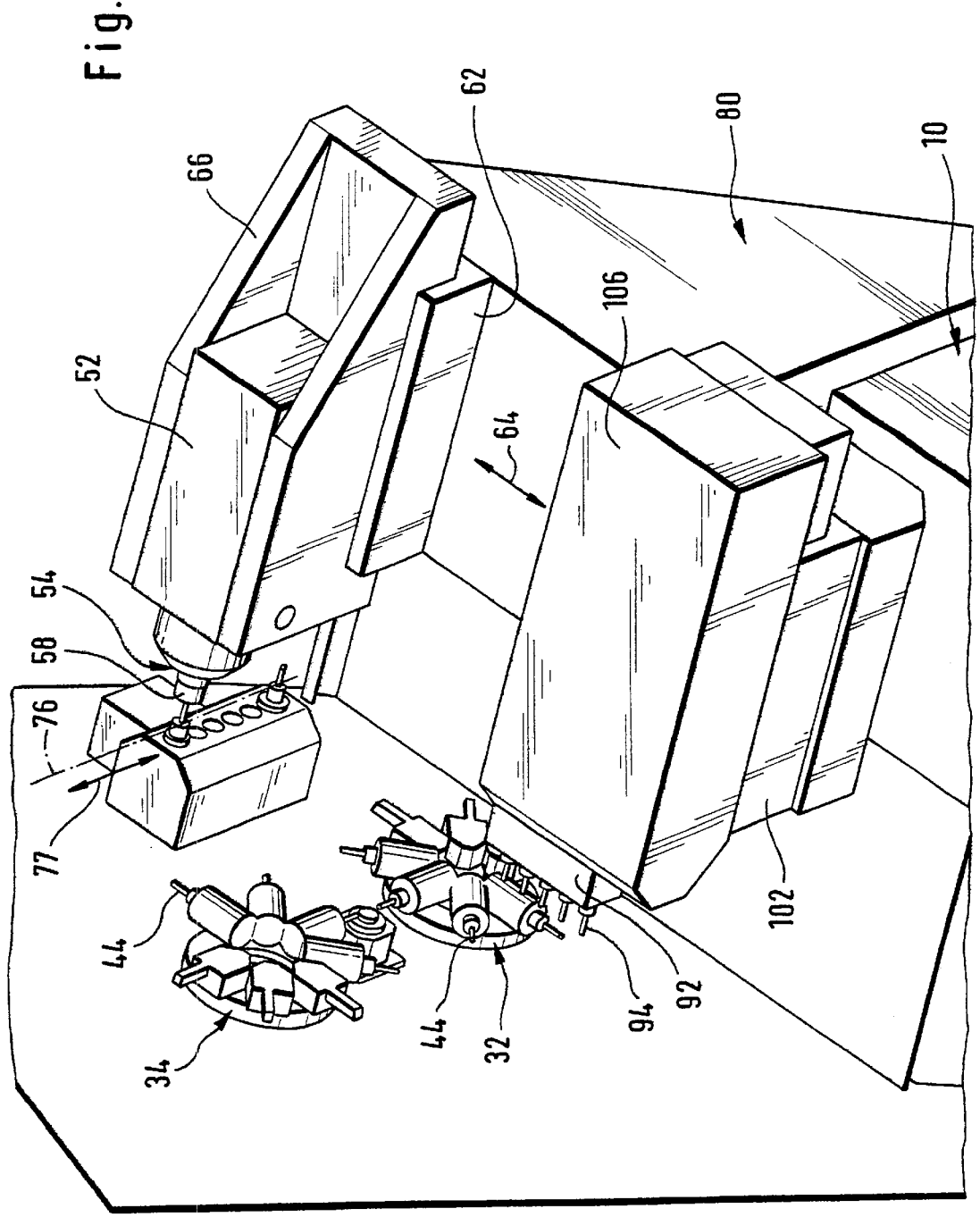
FIG. 7 shows an enlarged, perspective view similar to FIG. 1 which shows the machining of the second workpiece with a second tool carrier on the front side with an uppermost tool.
Figure 8:
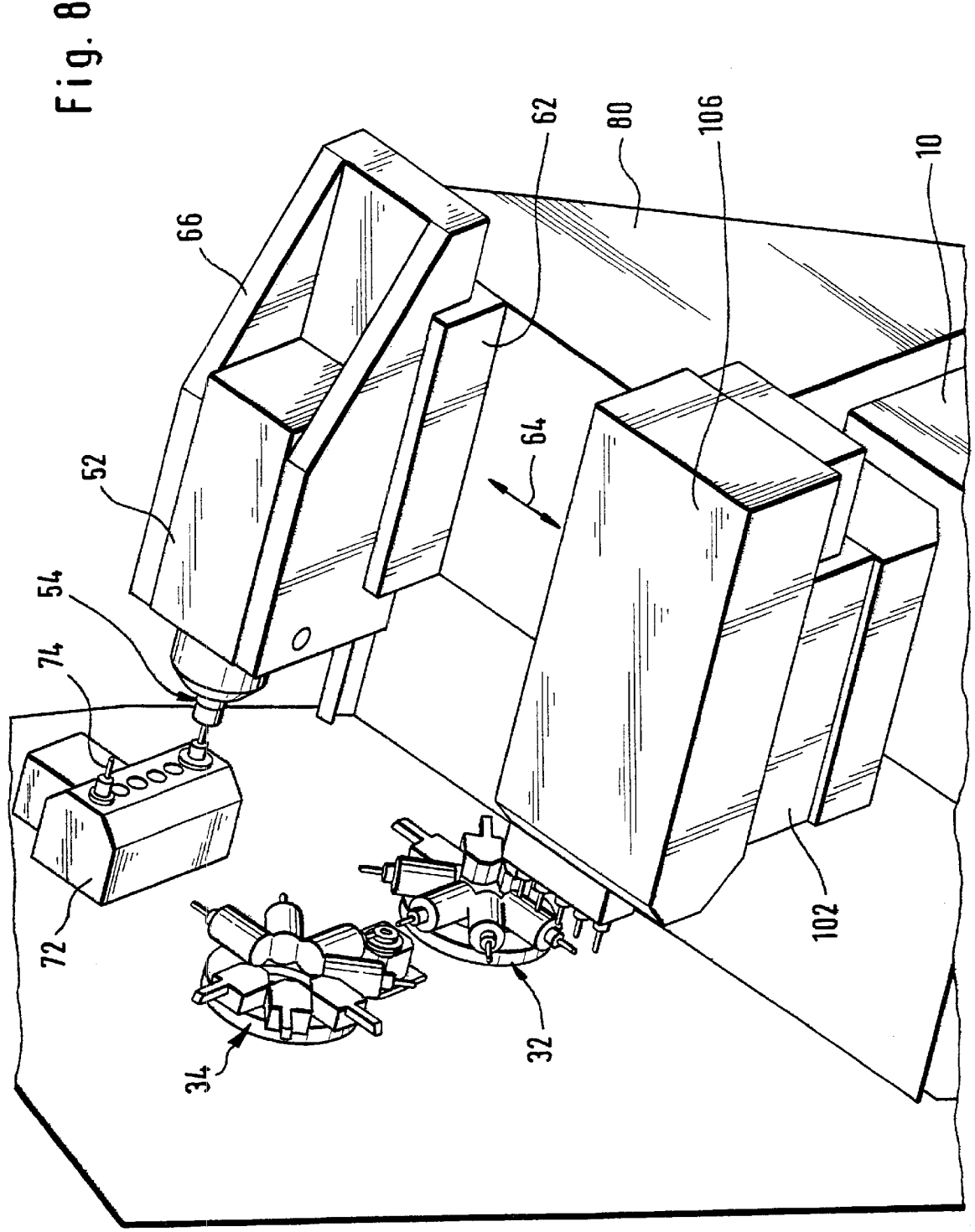
FIG. 8 shows an illustration similar to FIG. 7 which shows a machining of the second workpiece with a lowermost tool of the second tool carrier on the front side.
Figure 9:
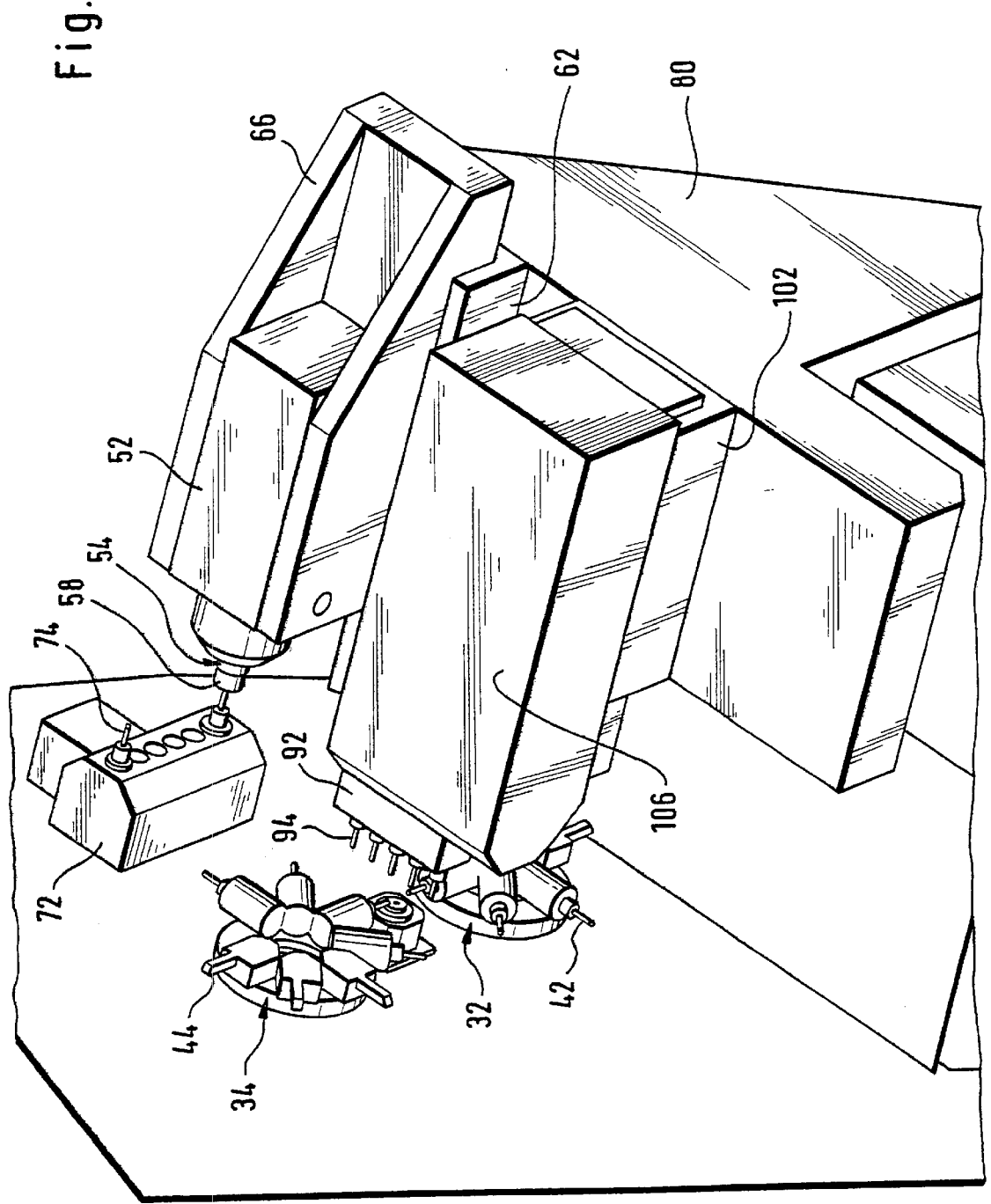
FIG. 9 shows an illustration similar to FIG. 7, in which a machining of the second workpiece takes place similar to FIG. 7 and tools of the first tool carrier on the front side can be used on the first workpiece.

In this respect, the second tool carrier 72 on the front side is preferably arranged on a side of the second working space 70 which is located opposite the second working spindle 54 in its operative position, wherein the tools 74 extend, for example, parallel to the second spindle axis 56 and are preferably arranged, as illustrated in FIG. 1 as well as FIGS. 7 to 9, as a row 76 along a longitudinal direction 77 which preferably extends parallel to the X direction.

In order to be able to reach all the tools 74, which are arranged so as to follow one another in the longitudinal direction 77, with the second workpiece 60 held in the second working spindle 54, the tool carrier 72 can itself be moved in relation to a console 80 bearing the cross slide 62 for the second working spindle 54 by means of an X slide 82, wherein the X slide 82 is preferably guided on a side wall 84 of the console 80 extending in X direction.

In order to have additional possibilities for the machining of the first workpiece 20, a first tool carrier 92 is provided on the front side which is arranged on a side of the longitudinal turning guide bush 22 located opposite the working space 30 and bears tools 94 which can be used on the first workpiece 20, for example, for machining its front face 20S.

The tool carrier 92 is seated on a cross slide 102 which can be moved in the transverse direction 64 in relation to the console 80 and a Z slide 106, which, for its part, bears the tool carrier 92, is seated on this cross slide 102.

The cross slide 102 is, in accordance with the invention, movable in the transverse direction 64 in relation to the console 80 independently of the cross slide 62 for the second working spindle 54 so that the machining of the first workpiece 20, guided in the longitudinal turning guide bush 22, can take place by means of the tools 94 not only in the transverse direction 64 but also the Z direction independently of the machining of the second workpiece 16 by means of the tools 74.

Figure 6:
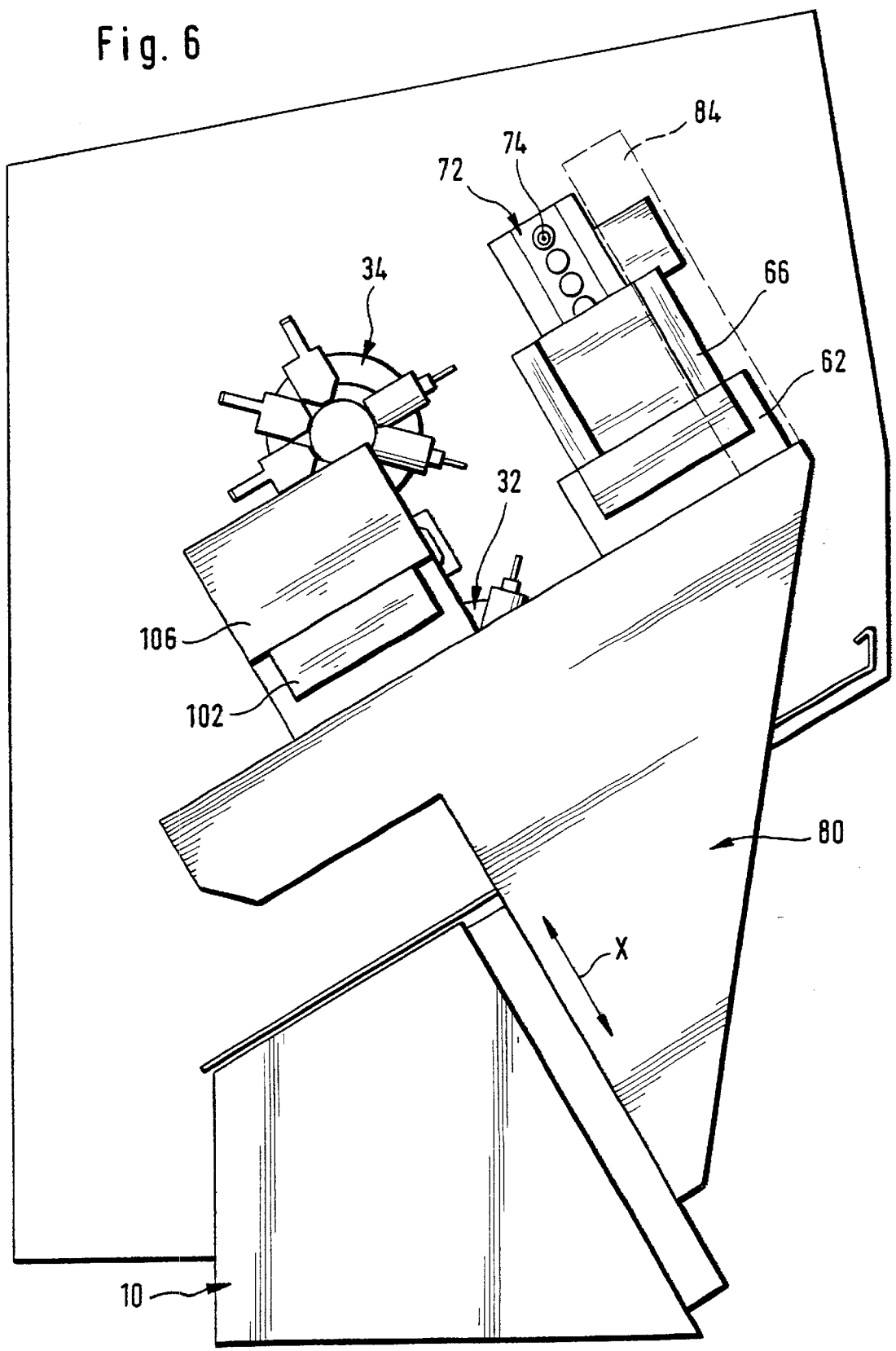
FIG. 6 shows an illustration similar to FIG. 5 with a console displaced to a maximum away from the machine base.

In order to be able to machine the first workpiece 20 held in the longitudinal turning guide bush 22 by means of the tools 94 in 3 axes, i.e., due to an axis movement in the direction parallel to the first working spindle 16, in this case in the direction of the Z axis, due to movement in the direction of the X axis as well as due to movement in the direction of the transverse axis 54, the entire console 80 is designed as an X slide and can be moved as such relative to the machine frame 10 parallel to the X direction, as illustrated in FIGS. 6 and 7.

As a result, it is possible with the first embodiment of the inventive lathe to machine the first workpiece 20, which forms part of the bar of material 21 and projects into the first working space 30 beyond the longitudinal turning guide bush 22, by means of the tools 42 and 44 of the tool carriers 32 and 34 and, in addition, by means of the tools 94 of the first tool carrier 92 on the front side, wherein the tools 94 are preferably arranged so as to follow one another in the longitudinal direction 97 as a row 96, wherein the row 96 extends parallel to the plane 36 so that a collision between the tools 42 and 44 as well as 94 can be avoided at least when a machining of the end face 20S of the workpiece 20 takes place with the tools 94.

In this respect, the machining of the end face 20S of the workpiece 20 can—as already explained—take place due to movement of the tools 94 in three different axis directions, i.e., in the direction of the X axis, in the direction of the transverse axis 64 and in the direction of the Z axis which extends parallel to the first spindle axis 16.

Furthermore, following machining of the first workpiece 20 a transfer thereof to the second working spindle 54 is possible, wherein, for this purpose, the second working spindle 54 is aligned with its second spindle axis 56 coaxial to the first spindle axis 16 and is displaced in the direction of the first workpiece 20 to such an extent that the first workpiece 20 can be clamped with the second receiving means 58 close to the end face 20S. Subsequently, the first workpiece 20 is cut off from the bar of material 21 with one of the tools 42 or 44.

The workpiece which has been cut off and is now held in the second receiving means 58 represents a second workpiece 60 which can be machined further by the tools 74 of the tool carrier 72 in the second working space 70 due to displacement of the second working spindle 54 in the transverse direction 64, wherein primarily a machining of the second workpiece 60 in the area of its end face 60S can take place in the second working space 70 next to the first working space 30.

This machining of the second workpiece 60 by means of the tools 74 is completely independent of the position of the console 80 in X direction since the tool carrier 72 is held on the X slide 82 which is guided, for its part, on the side wall 84 of the console 80 so as to be displaceable in X direction so that the tool carrier 72 always carries out, as a result, relative movements in relation to the console 80 and, therefore, relative movements also in X direction in relation to the second spindle axis 56 which is arranged in X direction so as to be non-displaceable relative to the console 80 so that the positions of the console 80 in X direction merely have an effect on the relative positions of the tools 94 of the first tool carrier 92 on the front side for the machining of the first workpiece 20 in the manner already described.

The machining of the first workpieces 20 and of the second workpieces 60 is preferably brought about in such a manner that during a final machining of a second workpiece 60 by means of the tools 74 in the second working space 70 a machining of the subsequent, first workpiece 20 takes place at the same time in the first working space 30 by means of the tools 42, 44 and/or, where applicable, the tools 94, wherein the changeover between different tools 94 of the first tool carrier 92 on the front side can be brought about as a result of displacement of the cross slide 102 in the transverse direction 64 relative to the respective first workpiece 20.

In order to carry out the machining operations, a machine control 110 is provided which controls all the axis movements for exact positioning, i.e., in particular, the movements of the Z slide 24 for the first working spindle 14, of the tool carriers 32 and 34 for the tools 42 and 44, of the cross slide 102 and of the Z slide 106 as well as the X slide 80 for the first tool carrier 92 on the front side with the tools 94, of the cross slide 62 and the Z slide 66 for the second working spindle 54 and of the X slide 82 for the second tool carrier 72 on the front side with the tools 74.

In addition, the working spindles 14 and 54 are preferably not only drivable but also controllable as C axes by means of the machine control 110 at an exact angle.

The inventive lathe may be controlled particularly advantageously in that the axis movements for the machining of the second workpiece 60 by means of the tools 74, namely the movements of the second tool carrier 72 on the front side along the X axis, the movements of the second working spindle 54 in the direction of the transverse axis 64, which could also be designated as Y axis, and in the direction of the Z axis as well as the turning of the second workpiece 60 by the second working spindle 54 about a C axis are completely independent, on account of the construction of the lathe, from the axis movements for the machining of the first workpiece 20, namely the movement of the first workpiece 20 in Z direction due to displacement of the first working spindle 14, the movement of the tools 42 and 44 in X direction, the movement of the tools 94 in X direction due to displacement of the console 80, in transverse direction due to displacement of the cross slide 102 and in Z direction due to displacement of the cross slide 106 as well as about the C axis due to suitable, controlled turning of the working spindle 14.

In addition, a maximum rigidity with respect to the guidance of the tools 74 relative to the second workpiece 60 can be achieved with a minimal thermal dislocation due to the provision of the movability of the second tool carrier 72 on the front side relative to the console 80.

In addition, the displaceability of the console 80 in X direction also has the advantage that a 2-axis movement of the second working spindle 54 is available for the coaxial positioning of the second spindle axis 56 relative to the first spindle axis 16, namely along the transverse axis 64 and the X axis.

In a second embodiment of an inventive lathe, illustrated in FIGS. 10 to 17, those parts which are identical to those of the first embodiment are given the same reference numerals and so reference can be made in full to the comments concerning the first embodiment.

As illustrated in FIGS. 10 to 14, the first tool carrier 92' on the front side facing the end face 20S of the first workpiece is not, in contrast to the first embodiment, designed as a tool carrier securely connected to the Z slide 106 but rather as a tool carrier 92' which can be pivoted about an axis 98 in relation to the Z slide 106 and has two rows 96a and 96b of tools 94a and 94b, respectively, which can be brought into an active position or an inactive position due to pivoting of the first tool carrier 92' on the front side about the pivot axis 98.

Figure 10:
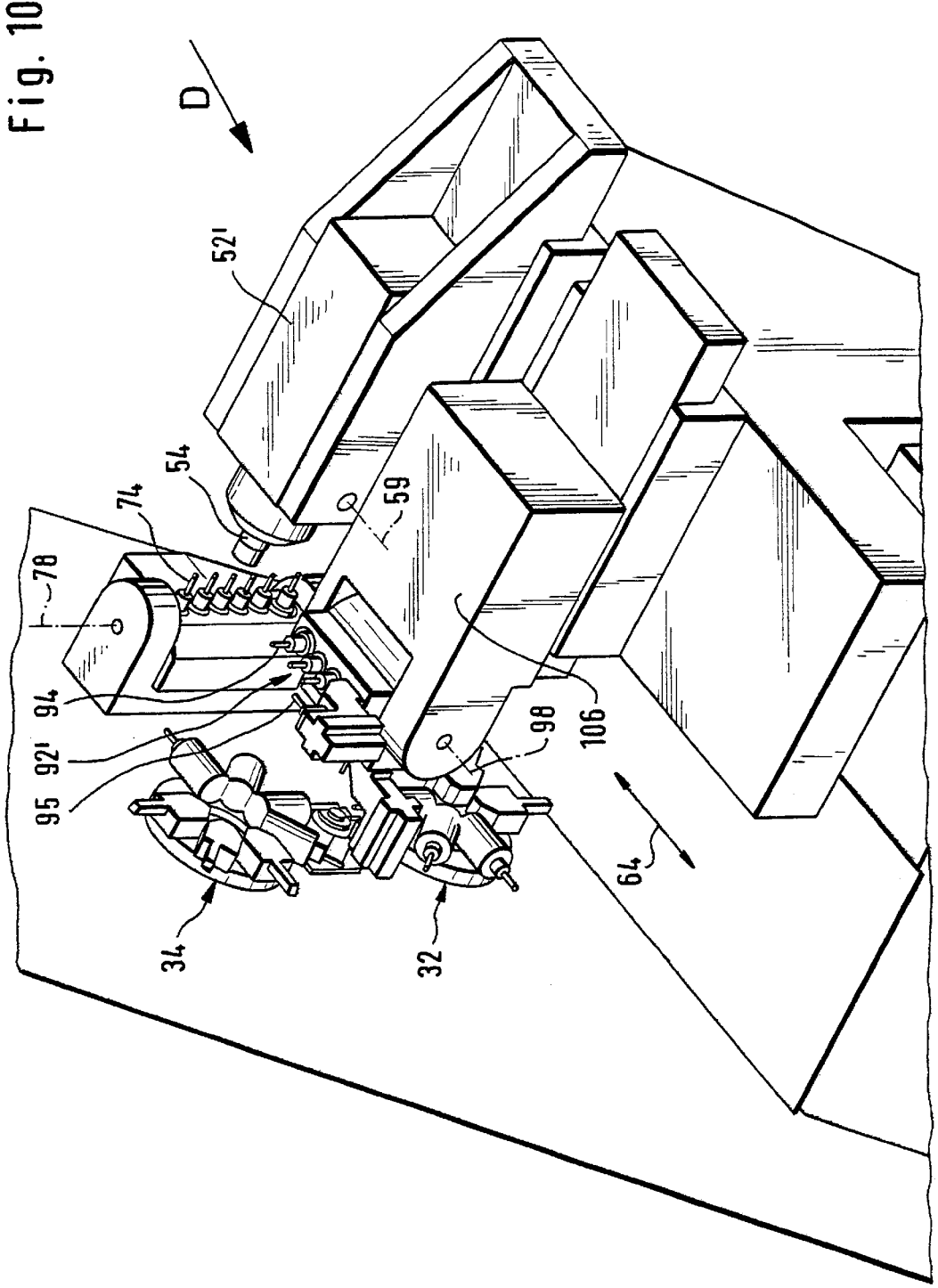
FIG. 10 shows a sectional, perspective illustration of a second embodiment of an inventive lathe.
Figure 11:
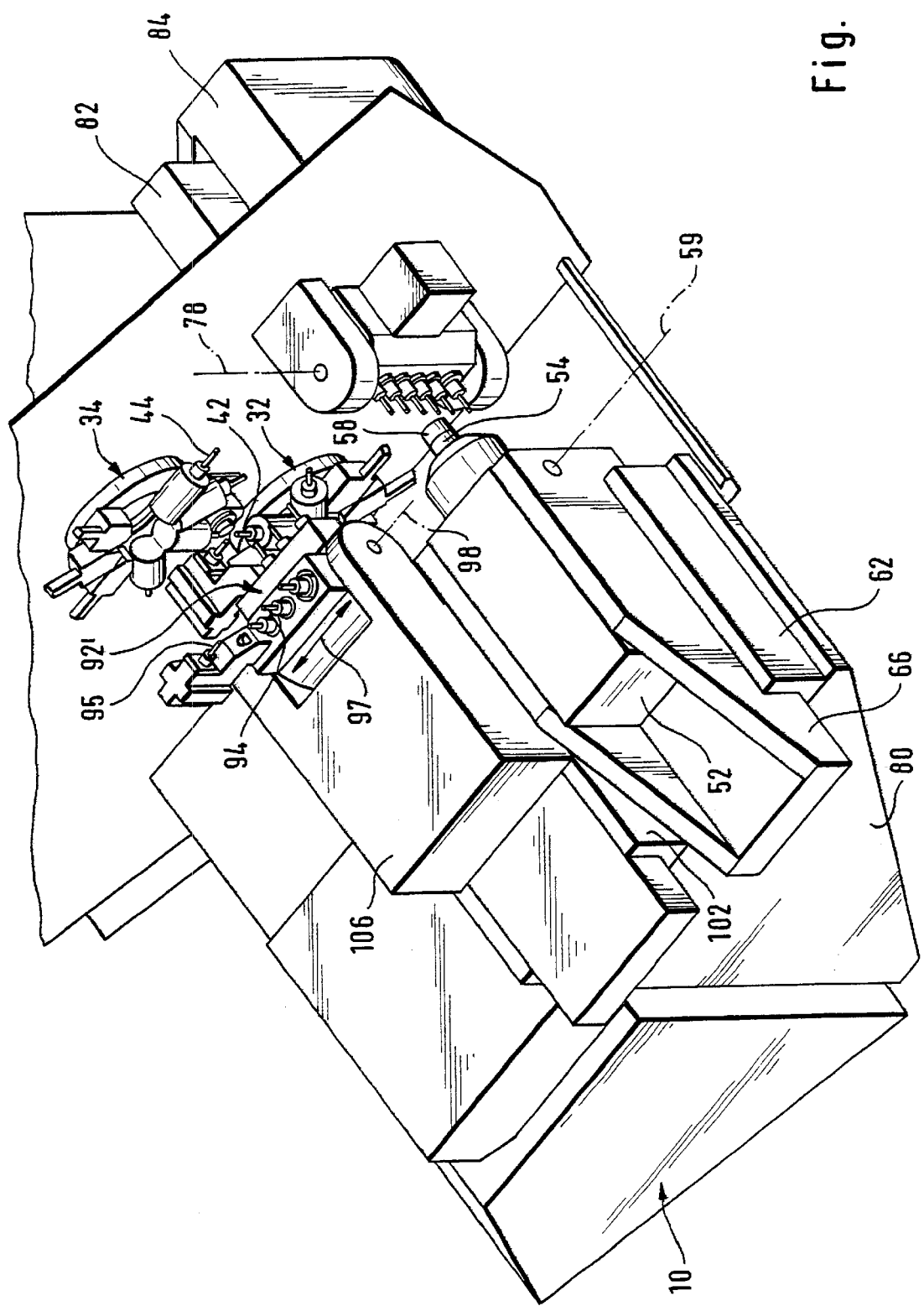
FIG. 11 shows a perspective illustration of the second embodiment according to FIG. 10 viewed in the direction of arrow D in FIG. 10.
Figure 12:
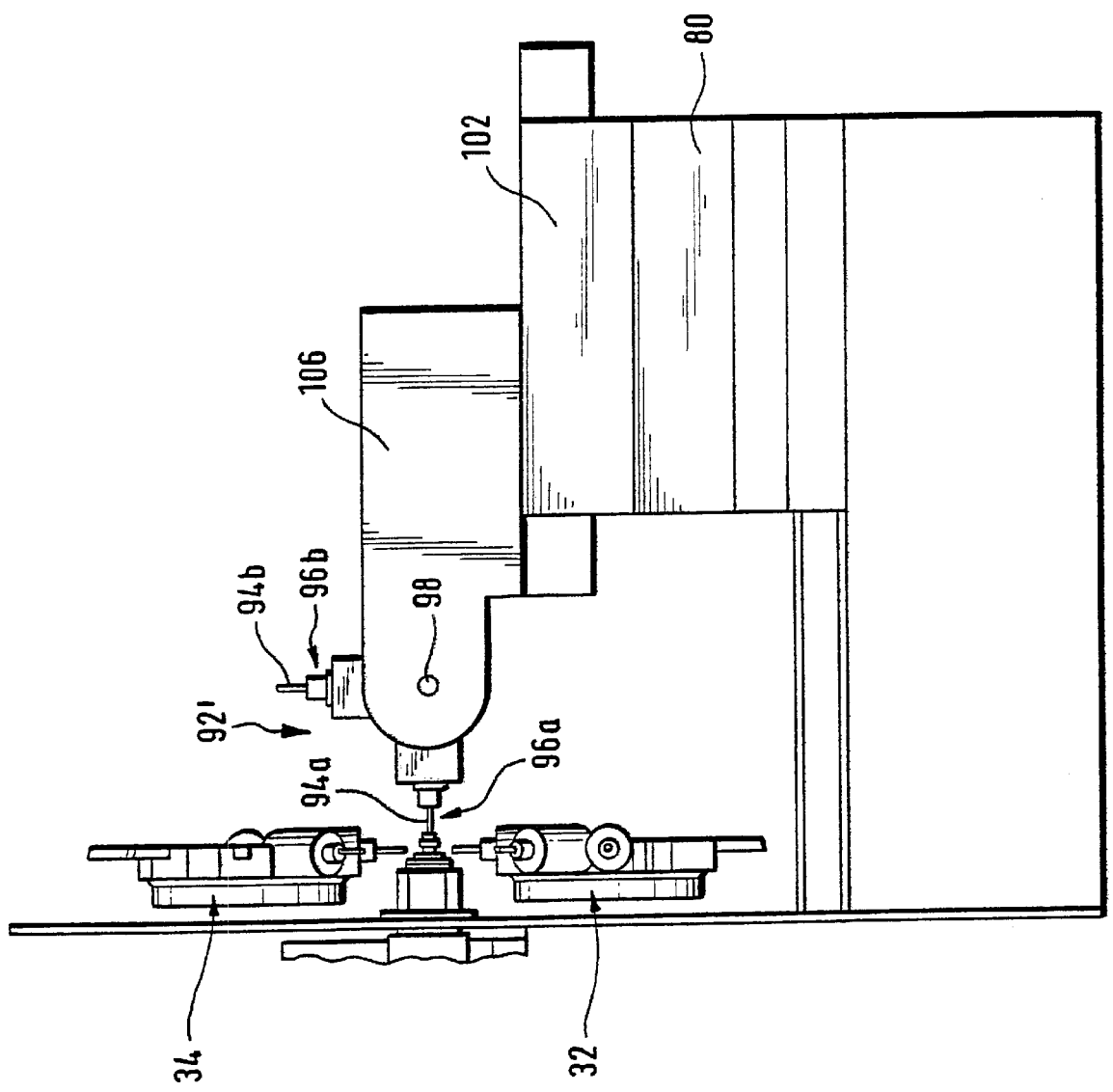
FIG. 12 shows a partial view of the second embodiment similar to FIG. 2 with a first row of tools of the first tool carrier on the front side in an active position and a second row of tools in an inactive position.

As illustrated in FIGS. 10 and 12, the row 96a of tools 94a is, for example, in the active position whereas the row 96b of tools 94b is in the inactive position.

Figure 13:
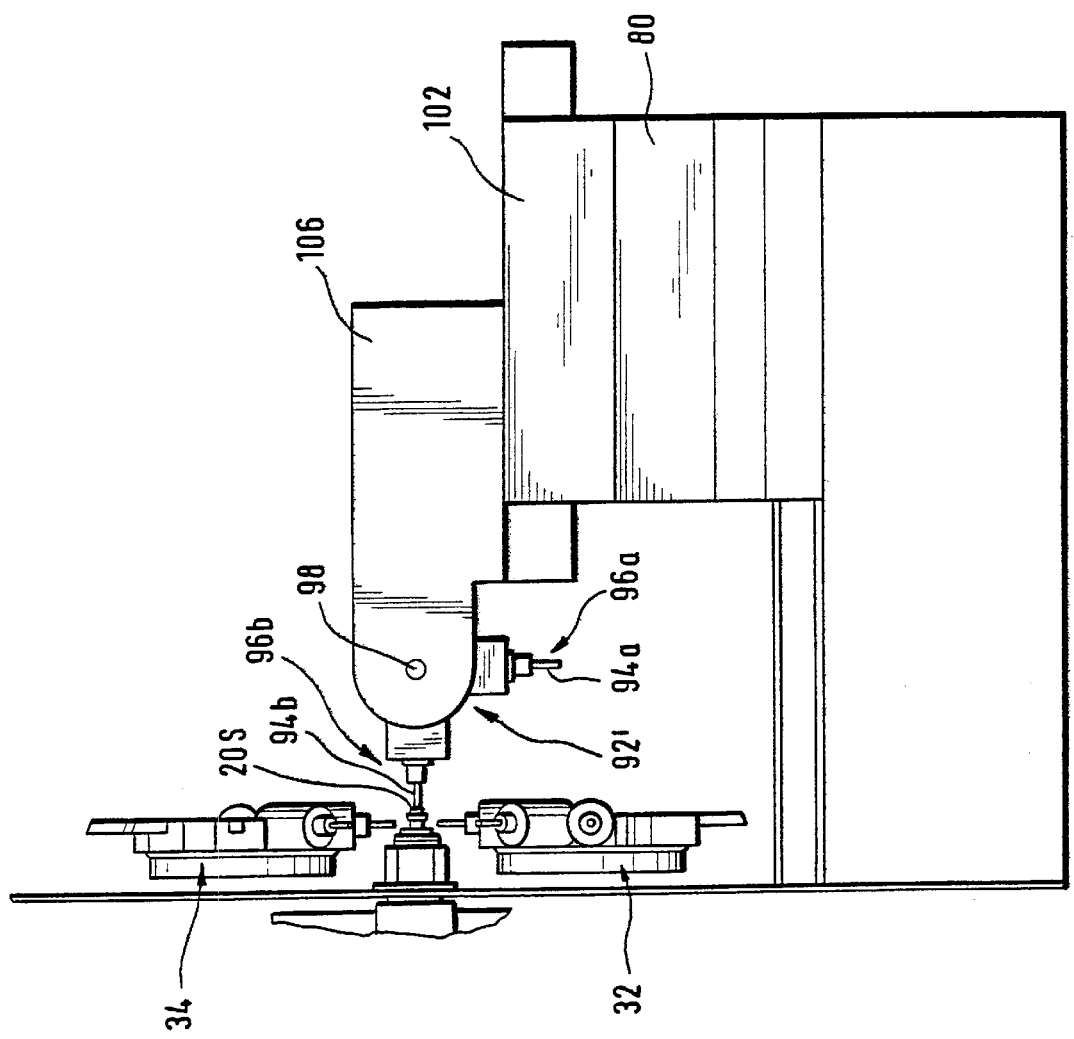
FIG. 13 shows an illustration similar to FIG. 12 with a second row of tools of the first tool carrier on the front side in an active position and a first row of tool carriers of the first tool carrier on the front side in an inactive position.

As illustrated in FIG. 13, the row 96b of tools 94b can, on the other hand, be brought into the active position by way of pivoting while the row 96a of tools 94a is in the inactive position.

Figure 14:
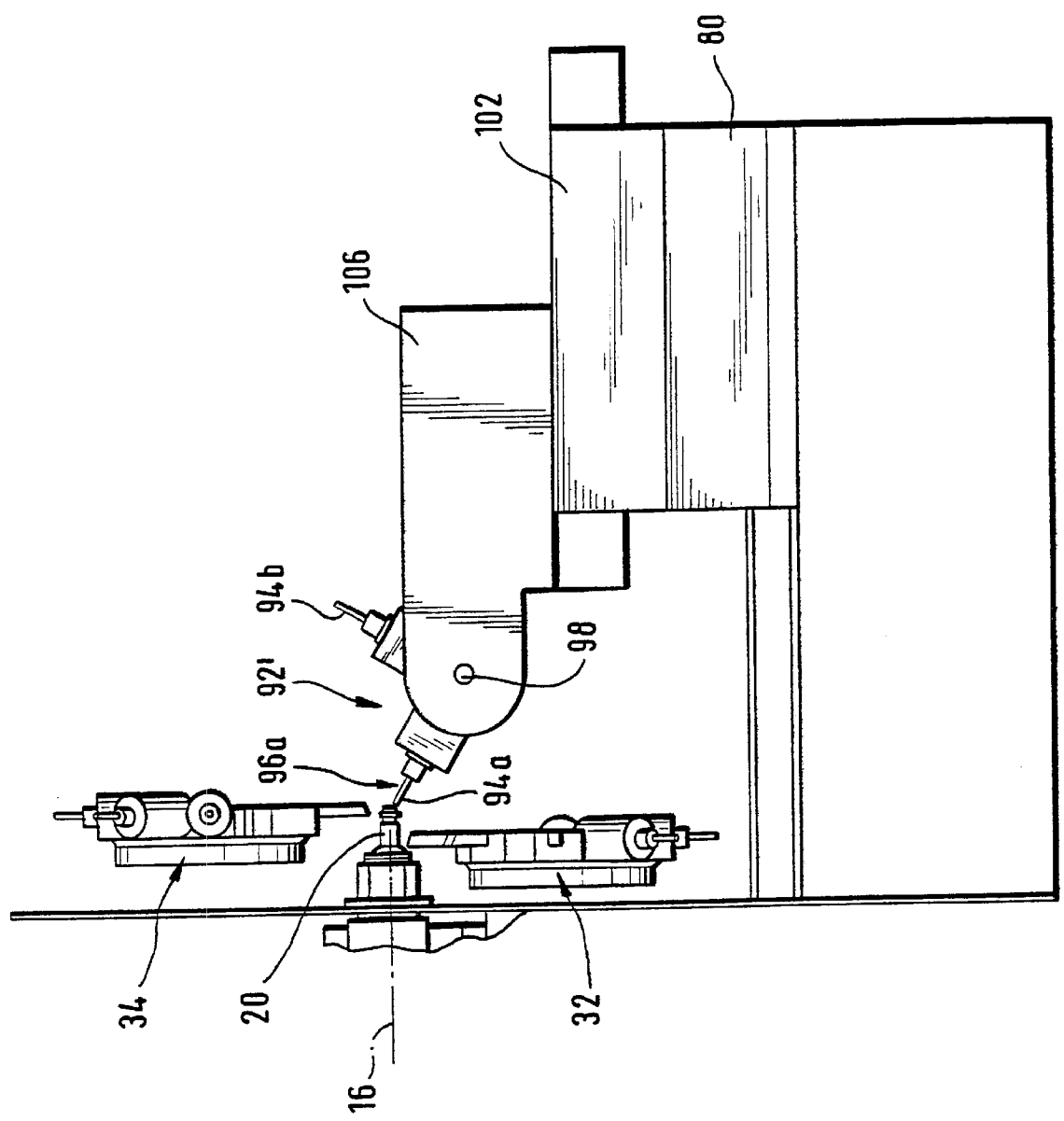
FIG. 14 shows an illustration similar to FIG. 12 with a first row of tools in an active position, wherein these are aligned at an acute angle relative to the first spindle axis.

In addition, it is also possible when the pivot axis 98 is designed as a B axis controllable by the machine control 110, as illustrated in FIG. 14, to bring the tools, for example, the tools 94a of the row 96a into a position extending at an angle in relation to the first spindle axis 16 so that machining operations on the first workpiece 20 which are directed at an angle to the first spindle axis 16, for example, bores can be realized.

The tools 94a, 94b preferably extend in a radial direction in relation to the pivot axis 98 so that the machining forces cause a minimal torque with respect to the pivot axis 98.

Furthermore, it is not only possible to use tools 94 directed radially to the pivot axis 98 in the tool carrier 92' but it is also possible, due to suitable tool holders, to use tools 95 which are aligned parallel to the pivot axis 98 and, therefore, to provide the possibility of a machining of the workpiece 20 on its outer surface, i.e., also a machining of the workpiece 20 in an area adjoining the end face 20S.

The pivot axis 98 is preferably aligned such that it extends parallel to the longitudinal direction 97 of the rows 96a and 96b and, in addition, preferably parallel to the plane 36 so that as collision-free a machining of the first workpiece 20 as possible can be realized with tools 94 and 95 of the tool carrier 92 supplementary to the tools 42 and 44.

As illustrated, in particular, in FIGS. 10, 11, 15 to 17, the second tool carrier 72' on the front side associated with the second working space 70 is, in addition, pivotable about a pivot axis 78 in relation to the X slide 82 so that it is possible to align the tools 74 not only parallel to the second working spindle 56 but also at any optional angles relative to it when the pivot axis 78 is designed as a B axis controllable by the machine control 110.

Figure 15:
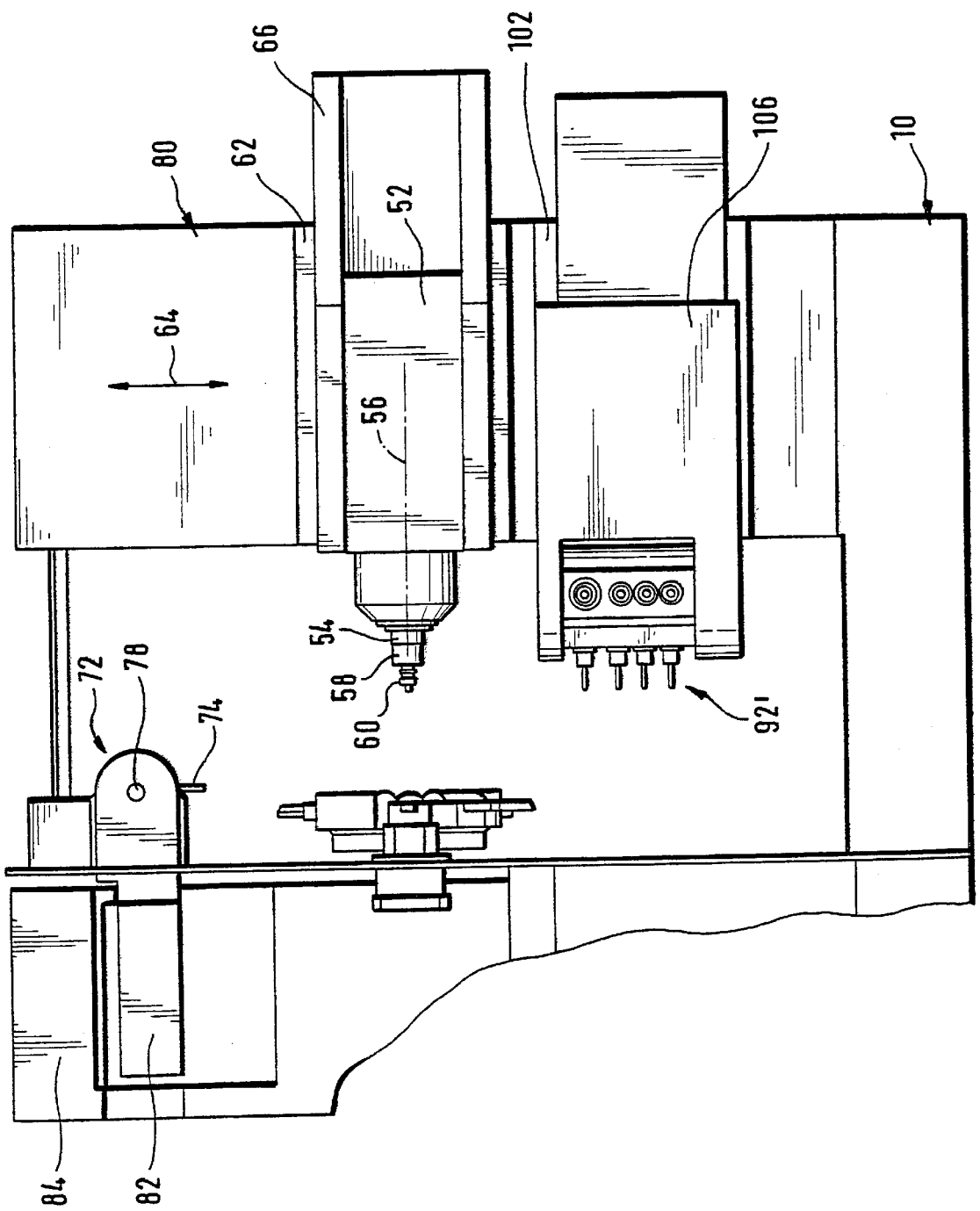
FIG. 15 shows a plan view of the second embodiment similar to FIG. 3 with a second tool carrier on the front side pivoted through 90°.

In the extreme case, it is possible, as illustrated in FIG. 15, to turn the tool 74 of the tool carrier 72 by way of rotation about the pivot axis 78 through approximately 90° to such an extent that this extends transversely to the second spindle axis 56 of the second working spindle 54.

The pivot axis 78 is preferably aligned such that it extends parallel to the longitudinal direction 77, along which the tools 74 forming the row 76 are aligned and, in addition, preferably parallel to the X direction so that the position of the tools 74 in X direction relative to the second working spindle 54 does not alter due to pivoting of the tools about the pivot axis 78.

To minimize the torque acting on the pivot axis 78 during the machining, the tools 74 are preferably aligned such that they extend radially to the pivot axis 78.

In addition, the spindle housing 52' of the working spindle 54 of the second embodiment is pivotable about a pivot axis 59 which can likewise be controlled by the machine control 110 and preferably extends transversely to the pivot axis 78 so that, as a result, the second spindle axis 56 can be moved altogether out of its orientation parallel to the plane 36 and, therefore, can be positioned in optional angular positions, for example, at an acute angle in relation to the plane 36 in order to be able to carry out, for example, machining operations at an angle to the second spindle axis 56 with the tools 74 which are all preferably oriented parallel to the plane 36.

In addition to the first embodiment, the second embodiment has the additional advantages that as a result of the pivot axis 78 for the second tool carrier 72 on the front side, in particular, its control as a B axis by means of the machine control 110, together with the control of the second working spindle 54 as a C axis, all the remaining machining operations on the second workpiece 60 can be realized by means of a B axis of a lathe.

Furthermore, the constructional solution may be designed in a particularly stable manner in that the tools 74 of the second tool carrier preferably extend radially to the pivot axis 78 so that the machining forces acting on it exert a small, if not imperceptible torque on the pivot axis 78 so that this can be realized in an adequately rigid manner with mechanically limited resources.

The pivot axis 78 is preferably realized such that at least one pivoting movement of the second tool carrier 92' on the front side can be realized through an angle of 90°.

The second embodiment has, in addition, as a result of the provision of the pivot axis 98 for the first tool carrier 92 on the front side the advantage that the number of tools which can be used may be multiplied due to the provision of the two rows 96a and 96b of tools 94a and 94b, respectively.

In addition, customary B axis machining operations on the first workpiece 20 may be realized due to control of the pivoting movement of the first tool carrier 92 on the front side about the pivot axis 98 designed as a B axis by means of the machine control 110.

The first tool carrier 92' on the front side is also preferably pivotable about the pivot axis 98 with an angle of at least 90°.

Finally, the pivot axis 59 for the second working spindle 14 also creates the advantage of the adjustment of a further inclination between the tools 74 of the second tool carrier 72 on the front side and the second workpiece 60 so that highly complex machining operations are possible for the final machining of the second workpieces 60.

What is claimed is:

1. Lathe comprising:
   a machine frame,
   a first working spindle held on the machine frame and rotatable about a first spindle axis, said working spindle having a first receiving means for a first workpiece,
   at least one first tool carrier movable in an X direction transversely to the first spindle axis for the machining of the first workpiece,
   a second working spindle rotatable about a second spindle axis, said second working spindle having a second workpiece receiving means for a second workpiece and the second working spindle being adapted to be brought from a coaxial position with the second spindle axis coaxial in relation to the first spindle axis into a non-coaxial position in a transverse direction extending transversely to the X direction and transversely to the first spindle axis, the first and second spindle axes being arranged at a distance from one another in said non-coaxial position,
   and a first front side tool carrier for machining of the first workpiece in a position facing a front side of said first working spindle, said first front side tool carrier being associated with a first working space and being adapted to be moved from an inactive into an active position and vice versa with at least one tool as a result of a movement transversely to the X direction,
   and a second front side tool carrier for machining of the second workpiece in a position facing a front side of said second working spindle, said second front side tool carrier being associated with a second working space and arranged so as to be offset in the transverse direction in relation to the first working space,
   wherein the first tool carrier on the front side and the second working spindle are movable relative to one another in the transverse direction controlled by a machine control.

2. Lathe as defined in claim 1, wherein the first tool carrier on the front side and the second working spindle are each seated on a cross slide movable in the transverse direction.

3. Lathe as defined in claim 2, wherein the first tool carrier on the front side is seated on the same support as the second working spindle with its cross slide.

4. Lathe as defined in claim 1, wherein the first tool carrier on the front side and the second working spindle are seated on a common slide movable in X direction in relation to the machine frame.

5. Lathe as defined in claim 1, wherein the second tool carrier on the front side is movable transversely to the second spindle axis and in a direction extending transversely to the transverse direction.

6. Lathe as defined in claim 5, wherein the second tool carrier on the front side is movable in the X direction.

7. Lathe as defined in claim 5, wherein the second tool carrier on the front side is guided on the console bearing the cross slide for the second working spindle so as to be movable.

8. Lathe as defined in claim 1, wherein the second working spindle is movable in the direction of the second spindle axis.

9. Lathe as defined in claim 8, wherein the second working spindle is seated on a Z slide arranged for its part on the cross slide.

10. Lathe as defined in claim 1, wherein the second working spindle is pivotable about a pivot axis extending transversely to the second spindle axis.

11. Lathe as defined in claim 10, wherein the pivot axis extends transversely to the X direction.

12. Lathe as defined in claim 11, wherein the pivot axis extends approximately parallel to the transverse direction.

13. Lathe as defined in claim 1, wherein the first tool carrier on the front side is movable in a direction parallel to the first spindle axis.

14. Lathe as defined in claim 13, wherein the first tool carrier on the front side and the second working spindle are movable in the direction of the spindle axes independently of one another.

15. Lathe as defined in claim 14, wherein the first tool carrier on the front side is seated on a Z slide movable in Z direction and seated for its part on the cross slide.

16. Lathe as defined in claim 1, wherein the first tool carrier on the front side has a row of tools arranged so as to follow one another in a longitudinal direction.

17. Lathe as defined in claim 16, wherein the longitudinal direction extends approximately parallel to the transverse direction.

18. Lathe as defined in claim 1, wherein the first tool carrier on the front side has at least two tools arranged around a pivot axis in angular spaced relationship to one another, said tools being adapted to be brought into an active or inactive position due to pivoting of the tool carrier about the pivot axis.

19. Lathe as defined in claim 18, wherein the pivot axis extends approximately parallel to the transverse direction.

20. Lathe as defined in claim 18, wherein the pivot axis is designed as a B axis adapted to be controlled by the machine control.

21. Lathe as defined in claim 1, wherein the second tool carrier on the front side has a row of tools arranged so as to follow one another in a longitudinal direction.

22. Lathe as defined in claim 21, wherein the longitudinal direction extends approximately parallel to the direction of movement of the second tool carrier on the front side.

23. Lathe as defined in claim 1, wherein the second tool carrier on the front side has at least two tools arranged about a pivot axis in angular spaced relationship, said tools being adapted to be moved from an active into an inactive position and vice versa due to pivoting of the second tool carrier about the pivot axis.

24. Lathe as defined in claim 23, wherein the pivot axis extends approximately parallel to the direction of movement of the second tool carrier on the front side.

25. Lathe as defined in claim 23, wherein the pivot axis is designed as a B axis adapted to be controlled by the machine control.

26. Lathe as defined in claim 18, wherein the tools of the tool carriers on the front side are arranged relative to the pivot axis such that the force acting on the tools during machining is directed essentially in a radial direction in relation to the pivot axis.

27. Lathe as defined in claim 1, wherein the first working spindle is guided on the machine frame for displacement in the direction of the first spindle axis.

28. Lathe as defined in claim 1, wherein the guidance of the first workpiece during the machining is brought about by a longitudinal turning guide bush.

29. Lathe as defined in claim 28, wherein the longitudinal turning guide bush is arranged relative to the machine frame so as to be non-displaceable in the direction of the first spindle axis.

* * * * *